Aug. 30, 1960  F. V. MURPHY  2,950,547
SNOW REMOVING IMPLEMENT WITH CONVEYOR MEANS
Filed Aug. 7, 1957  2 Sheets-Sheet 1
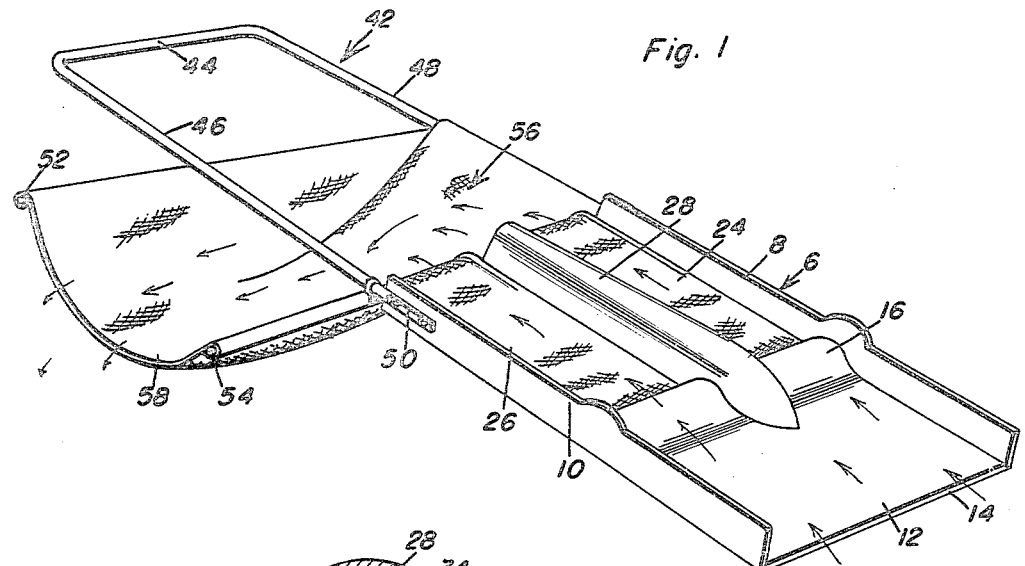
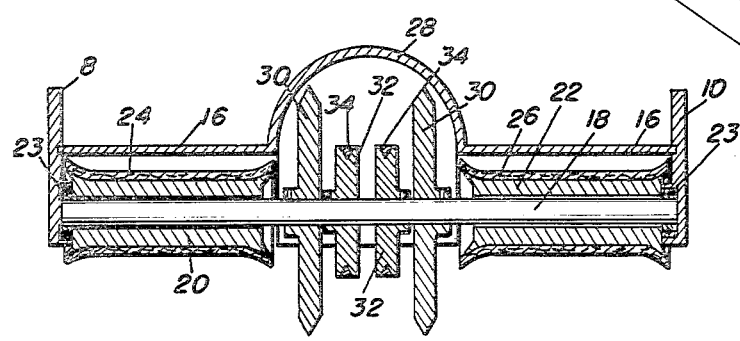
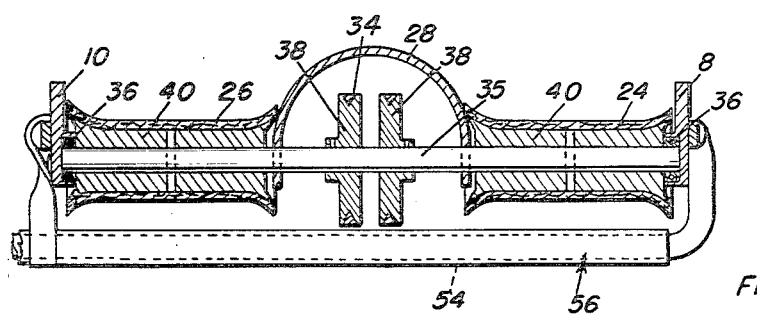
Frank V. Murphy
INVENTOR.

Aug. 30, 1960   F. V. MURPHY   2,950,547
SNOW REMOVING IMPLEMENT WITH CONVEYOR MEANS
Filed Aug. 7, 1957   2 Sheets-Sheet 2
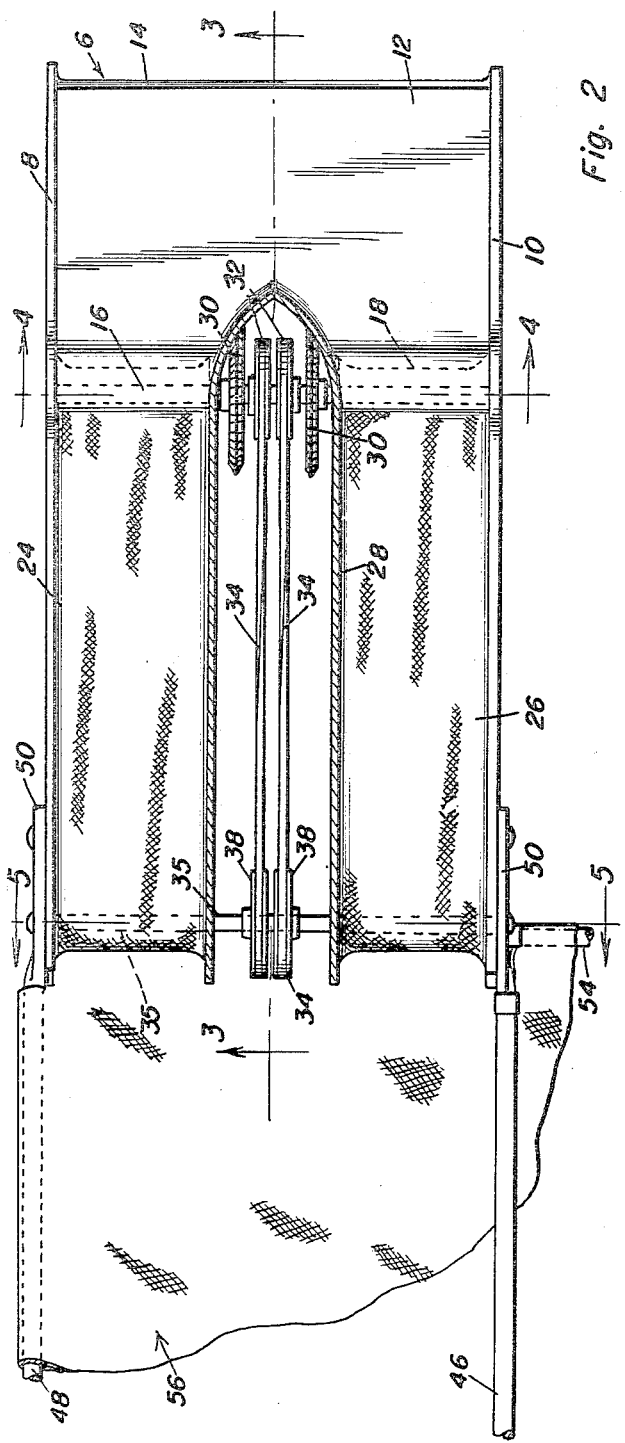
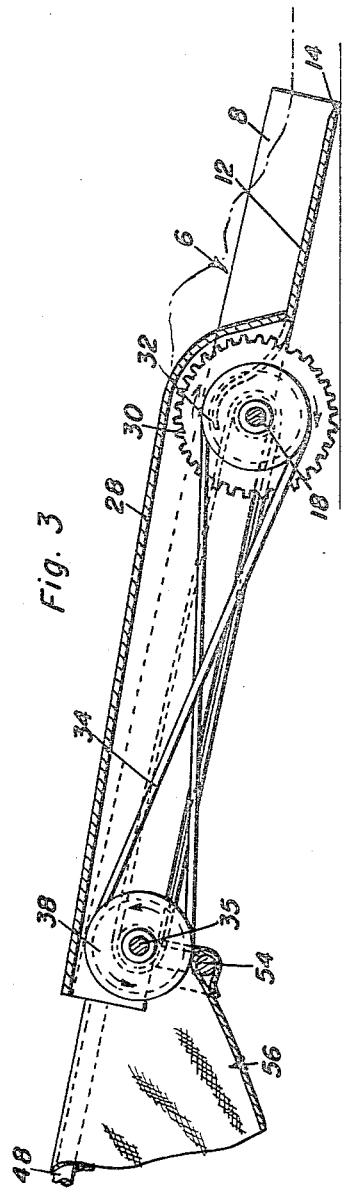
Frank V. Murphy
INVENTOR.

United States Patent Office 2,950,547
Patented Aug. 30, 1960

2,950,547

SNOW REMOVING IMPLEMENT WITH CONVEYOR MEANS

Frank V. Murphy, Freeport, N.Y., assignor of one-sixth each to Thomas J. Murphy, Freeport, Leo J. Murphy, Merrick, Frances G. Murphy, Freeport, George A. Murphy, Seaford, Kathleen V. Murphy, Freeport, and Joseph W. Murphy, Merrick, N.Y.

Filed Aug. 7, 1957, Ser. No. 676,754

4 Claims. (Cl. 37—53)

This invention relates to a portable manually maneuverable snow scraping, elevating and dumping implement which is suitably constructed and adapted to scrape and clear accumulated snow from one's pavement, walk-way, driveway or similar surface in and around the rear and front door areas.

At the outset it may be further pointed out that the invention herein revealed has to do with certain structural adaptations and variations which may be related to my co-pending application Serial No. 661,642, now Patent No. 2,891,330, also directed to a snow clearing implement and filed on May 27, 1957.

My prior effort has to do with an elongated channel-like scoop having an upper discharge end. The discharge end is so arranged and constructed that it functions to empty the upwardly moving load of snow into a trough-like trap. The trap is so constructed and inclined and laterally located that it functions not only as a trap but also as a dumping chute. Consequently, the snow which is shunted to one side of the surface which is being cleaned, and where it is to be piled up, is out of the way in an advantageous manner.

In carrying out the principles of the present invention I feature a special adaptation which is novel and distinct in that the major median and upper portion of the elongated channel or scoop is constructed to provide at least one, preferably two, relatively narrow endless conveyors. The conveyors are separated by a lengthwise shield or divider and are belt driven and the belts in turn are driven by traction wheels mounted on shafts supported therefor on the scoop. The construction also includes a U-shaped push-pull handle construction and a canvas or an equivalent snow accumulating and dumping chute.

Other objects, features and advantages will become more readily apparent from the following description and the accompanying drawings.

In the drawings wherein like numerals are employed to designate like parts throughout the views:

Fig. 1 is a perspective view of a snow removing device or implement and conveyor means constructed in accordance with the principles of the present invention and showing the same in the approximate position in which one would use it.

Fig. 2 is an enlarged top plan view and wherein portions are broken away and other portions appear in section.

Figs. 3 and 4 are sections on the lines 3—3 and 4—4, respectively of Fig. 2 looking in the direction of the arrows.

Fig. 5 is a cross-section on the line 5—5 of Fig. 2.

Referring now to the drawings the open ended elongated channel-like scoop is denoted generally by the numeral 6. It has spaced parallel vertical side walls 8 and 10 connected at their leading or forward ends to an intervening substantially flat bottom 12. The forward edge of the latter is sharpened to provide a scraping blade 14. The rearward end portion of the bottom which terminates somewhat near the center of the overall scoop is shaped up and convexly formed at 16 to provide a transverse riser and also a shield. With reference at this point to Fig. 4 attention is directed to a transverse motion transmitting shaft 18 which is located and partially housed beneath the shield 16 and has its end portions mounted for free rotation in supporting bearings 23 appropriately mounted on the interior side walls 8 and 10 of the scoop. This shaft is provided at its end portions with a pair of idling drums 20 and 22 for the adjacent cooperating ends of the canvas or equivalent endless belts (conveyor belts) 24 and 26. These drums and belts are to the right and left of the longitudinal center and at the longitudinal center point there is a centrally disposed inverted channel-shaped shell which shields and provides a pulley guard 28. Referring again to Fig. 4 the central portion of the shaft beneath the guard 28 is provided with fixedly mounted surface contacting and driving wheels 30. These wheels are in spaced apart relationship and are adapted to roll along the ground or other surface in the manner shown in Fig. 3. As they are pushed or rolled along they impart rotation to the shaft 18 and in turn to the attached pulleys 32 which, in turn, operate the adjacent ends of the endless motion transmitting pulley belts 34 which are crossed at their central portions (Fig. 3) and are trained at their upper ends over the upper pulleys 38 which are mounted on the shaft 35, said shaft having its ends journaled in appropriate bearings 36 mounted on the side walls of the scoop. This shaft 35 (Fig. 5) is provided with additional drums 40 which are fixed on the shaft and over which the adjacent cooperating ends of the endless belts are trained.

It will be evident that the elongated pulleys 20, 22, and 40 are differentiated from the disk-like pulleys in that they are called "drums." It is over these drums that the relatively narrow endless canvas conveyor belts are trained. The drums 20 and 22 on the shaft 18 are free to turn while the drums 40 on the upper shaft 35 are pinned or keyed to the shaft for rotation therewith. Both sets of pulleys 32 and 38 on shafts 18 and 35 respectively are, of course, fixed to their respective shafts. It follows that the larger disk-like wheels 30 derive motion by contacting the ground and turn the shaft 18 and the motion is transmitted from this shaft by way of the pulleys 32 and belts 34, in an obvious manner. Not only does the elongated guard 28 divide the two relatively narrow endless belts it properly houses the wheels 30, pulleys 32, 38 and the endless motion transmitting belts thus providing the desired source of protection for these parts. It is also clear that only the lower half-portion of the scoop is of metal and, hence, this provides a sort of a pan. The elongated guard 28 is, of course, of metal but is centralized between the inward longitudinal edge portions of the belts 24 and 26 and hence the snow which accumulates in the pan is divided and the mass is broken up to avoid jamming.

Attention is now directed to push-pull handle means 42 having a bight portion 44 and side limbs 46 and 48. The forward ends of these limbs are superimposed upon and rigidly connected to the adjacent upper end portions of the side walls 8 and 10 of the scoop as denoted at 50. The transverse frame members 52 and 54 which are connected with the limbs of the handle serve in conjunction with the handle to support the trapping and dumping canvas chute 56. The discharge end portion 58 projects well to the left of the handle means 42 so that snow which is accumulated in the trap will be nicely delivered to one side where it may be piled for subsequent handling.

It will be evident that by resting the leading knife-like edge portion of the scoop on the walk-way or other surface which is to be cleaned and also resting the traction wheels 30 on the surface the implement is ready to be used. Manifestly, it may be pushed and pulled and maneuvered from suitable angles to one side or the other depending on how one desires to scrape the snow for elevation and disposed purposes. Snow may thus be scooped up and as it accumulates and rides up the pan-like bottom 12 between the confining walls 8 and 10 it gradually approaches and rides up over the hump 16 where the over-all deposit is somewhat divided into half-portions and the batches of snow are carried upwardly by the rotating endless conveyor belts. The snow is dumped into the accumulating trap and is shunted laterally to one side and finally piles up for convenient disposition along side of the walk-way.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A manually maneuverable snow scraping, conveying and disposal implement comprising an elongated scoop having transverse scraping means across its leading end and which is otherwise constructed at said leading end to gather and conduct accumulated snow upwardly toward the walking attendant, said scoop being open at its upper discharge end and being substantially channel-shaped in cross-section to confine and channel the snow, a push-pull handle connected to said upper discharge end, trap means cooperable with said discharge end and adapted to collect and laterally shunt the progressively trapped snow to one side of the scoop and the path traversed thereby, conveyors operatively embodied in the bottom of said scoop, said conveyors each including an endless belt, the belts being mounted for operation on operating drums supported at longitudinally spaced transversely disposed points on and within said scoop, and said drums being mounted on shafts and said shafts being mounted for rotation on the scoop, one of said shafts having ground engaging traction and motion pickup wheels so that the shaft carrying said wheels is rotated by the action of the traction wheels, the respective shafts being provided with motion transmitting pulleys over which motion transmitting belts are trained and operated, said motion transmitting belts being crossed at their respective median portions.

2. The structure defined in claim 1 and wherein said push-pull handle comprises a U-shaped frame having a bight portion and limb portions, the bight portion providing a hand grip and the distal ends of said limbs straddling and being joined to the adjacent upper ends of the side portions of said scoop, said trap means comprising a canvas trough-like chute supported in part by a discharge end portion of the scoop and in part by the limbs of said handle, said chute being open at the intake end and having an inclined bottom and being open at the discharge end, the discharge end portion projecting beyond the adjacent limb and longitudinal side of the handle and scoop respectively to facilitate emptying the trapped snow to one side of the portion of the pathway which has been cleaned of snow.

3. The structure defined in claim 2, and wherein said scoop is provided at its longitudinal center portion with a longitudinally extending inverted channel-shaped shell providing a pulley guard and also functioning as a divider, the respective conveyor endless belts being positioned to the left and right of said guard and the lower leading end of said guard merging into the bottom wall of the scoop and cooperating therewith in piloting the accumulating snow onto the respective conveyors.

4. A manually maneuverable snow scraping, elevating and disposal implement comprising an elongated scraping, gathering and dumping scoop channel-shaped in cross-section and having a pair of spaced parallel upstanding side walls and an intervening bottom wall, the leading end of the bottom wall constituting a transverse scraper and extending between the side walls and terminating in a convex shield at the transverse median portion of the over-all scoop, an elongated inverted channel-shaped shell having its lower leading end attached to the median rear end portion of said bottom wall and extending in spaced relation upwardly and between the respective side walls, a first shaft mounted for rotation on said scoop beneath said shield, said shaft being provided with first conveyor belt drums and motion transmitting pulleys, a second shaft mounted for rotation adjacent the upper discharge end of said scoop and likewise provided with second conveyor drums and motion transmitting pulleys, endless conveyor belts trained over the respective first and second drums, and motion transmitting belts trained over respective motion transmitting pulleys.

References Cited in the file of this patent

UNITED STATES PATENTS

| 262,535 | Craig | Aug. 8, 1882 |
| 1,071,494 | Wylie | Aug. 26, 1913 |
| 1,531,496 | Parker | Mar. 31, 1925 |
| 2,778,184 | Beck et al. | Jan. 22, 1957 |
| 2,823,470 | Page | Feb. 18, 1958 |
| 2,847,770 | Wright | Aug. 19, 1958 |

FOREIGN PATENTS

| 325,058 | Germany | Sept. 8, 1920 |